United States Patent Office 3,115,432
Patented Dec. 24, 1963

3,115,432
METHOD FOR PRODUCING HIGH TEMPERATURE ELECTRICAL INSULATION
John H. O'Neill, Brooklyn, and Robert J. Parsons, City Island, N.Y., assignors to Sperry Rand Corporation, Great Neck, N.Y., a corporation of Delaware
No Drawing. Filed Nov. 2, 1959, Ser. No. 850,094
5 Claims. (Cl. 156—47)

This invention relates to a method for producing an insulated electrical conductor capable of continuous operation at extremely high temperatures.

In missiles and in aircraft jet engines, for example, it is required that electrical components operate for extended periods of time in extremely high temperature environments. In the past, some of the difficulties encountered in producing electrical components for use in such high temperature environments have been the inability to provide wire insulation which could withstand the high temperatures, and in attempts to produce electrical motors for use in high temperature environments it has been a major problem to obtain a satisfactory hermetic seal for the insulated wire when coiled to form a magnetic field coil. It has been found that prior methods of encapsulating a coil have caused the wire to break as a result of mechanical vibrations set up by current pulsations through the coil.

It is an object of this invention to provide a method for producing from a commercially available insulated wire an insulated covering which is capable of withstanding temperatures greatly in excess of the temperatures that the original wire could withstand.

A further object of the invention is to provide a simple and economical method for producing a wire insulation which is capable of withstanding a temperature in excess of 1000° F.

Another object of the present invention is to provide a method for producing an insulated wire coil capable of operating continuously in a temperature environment of at least 1000° F.

It is another object of the present invention to produce an encapsulated electrical coil assembly capable of continuous operation at extremely high temperatures.

It is a further object of this invention to provide a method for producing an extremely high temperature coil assembly in which commercially available wire having a lower temperature rating may be wound on a coil form by standard coil winding techniques.

These and other objects will become more apparent from the following description and claims.

The process of this invention will be explained, by way of an example, by describing the construction of a field coil assembly for a torque motor which was required to operate continuously in a temperature environment of 1000° F. The coil was wound on a hollow molybdenum coil form, or bobbin, which had a cross-section in the form of a rectangle having rounded corners, wherein the major and minor axes of the cross-section were .766 inch and .218 inch, respectively. The coil form was .332 inch high and had rectangular flanges of 1.104 by .536 inches at each end extending perpendicularly to the central axis of the hollow coil form.

The metallic coil form was electrically insulated by applying a glass coating to its outer surface in the following manner. The coil form was degreased using well known techniques, and then degassed by heating at 2600° F. in a hydrogen atmosphere for ten minutes. The coil form was cooled and the outer surfaces were painted with a thin coat of a solution of acetone having particles of a glass frit suspended therein. The glass frit chosen had a coefficient of expansion similar to that of molybdenum and was capable of withstanding a temperature well in excess of 1000° F. The painted coil form was then heated at 2400° F. in a hydrogen atmosphere for ten minutes. Upon cooling, the coil form had a uniform glass coating approximately .003 inch thick on its outer surfaces. Coil forms of stainless steel or other metals could be insulated in the same manner or could be insulated by spraying the outer surfaces with a ceramic insulating material. Also, if it would be practical with the size of coil form to be used, the entire form may be made of an insulating ceramic material.

A length of commercially available wire, of the type to be described below, was then wound on the insulated coil form by employing standard, well known, coil winding techniques to produce a coil having the desired number of turns. The wire selected for the coil had an insulating covering comprised of a silicone compound. Many types of commercially available wire which are intended for use in high temperatures have insulating coatings of a silicone compound. One particular wire which has been used successfully is "Ceroc 200" with heavy nickel plating, a product of Sprague Electric Company. This wire has a nickel plated copper conductor with a coating of alumina insulation surrounding the wire. A silicone varnish is applied to the alumina insulation as a further insulator and to act as a binder to protect the rather brittle alumina from cracking. The varnish does not form a distinct layer over the alumina, but penetrates into the porous alumina and acts as a sealer and binder. The wire used was 44 gage magnet wire and had a temperature rating of approximately 400° F.

We have discovered that the operating temperature of this commercially available wire can be increased appreciably by heating the wire to decompose the silicone compound to an ash-like substance. This was accomplished by baking the coil form with the wire wound thereon for one hour at a temperature of approximately 700° F. in an atmosphere containing oxygen. This accomplished two results: (1) it removed gas from the insulated coating of the wire, and (2) it converted the silicone varnish to a silica ($SiO_2$), an excellent electrical insulator which can withstand temperatures in excess of 1000° F. The baking of the coil form and wire was carried out in an oven to which air had ready access. The baking temperature and the time of baking were sufficient to allow substantially complete oxidation of the silicone to a silica.

During this baking process there may be some tendency for an unprotected copper wire to oxidize when the coil is baked in a high temperature atmosphere containing oxygen. We have found that the heavy nickel plating sufficiently protected the copper wire to prevent deleterious oxidation. In order to prevent undue oxidation of the conductor wire of the coil, it may be desirable to cool the wire in an inert atmosphere at the conclusion of the baking step just described.

We have found that upon cooling, the silica ash adhered to the wire of a formed coil having a one-eighth inch radius bend without flaking or cracking the insulated coating.

The coil of wire having the silica ash insulation was next hermetically sealed to prevent the possibility of further oxidation of the copper wire and to physically and chemically protect the coil. The method of hermetically sealing the coil was found to be an important step in the development of a successfully operating high temperature coil. One method that we found to be quite successful comprised the steps of lining an open-ended steel box with aluminum foil and placing the coil assembly within the lined box. A glass frit in a suspension of amyl acetate was then poured around the coil assembly. The suspension was made in the proportion of sixty parts by weight of amyl acetate and forty parts by weight of glass frit. The glass frit was a product known as #6646 Clear Glaze, manufactured by B. F. Drakenfield and Company, Inc. Solutions other than amyl acetate could be employed if desired so long as the liquid will evaporate in the heating process described below.

The suspension of frit was allowed to soak into the coil assembly for one hour. By soaking the coil in the fluid suspension of frit, the frit impregnates all turns of the coil and substantially eliminates the possibility of air being entrapped within and around the turns of the coil. Both the coil assembly and the suspension of frit were slowly raised in temperature to 1150° F. and maintained at that temperature for approximately thirty minutes. The coil assembly and suspension were initially raised to 300° F., and then the temperature was raised in steps of 75° F. every fifteen minutes until the temperature of 1150° F. was reached. At this temperature, the amyl acetate completely evaporated and the glass frit melted and flowed around the turns of wire of the coil. The assembly was then allowed to cool slowly to room temperature and was removed from the box. The glass formed a solid hermetic seal over the exterior portion of the coil and coil form. Excess glass was ground from the encapsulated coil assembly, and the process was completed.

In the process of impregnating the coil with the suspension of glass frit, it may in some instances be desirable to place the coil in a container and insert the container in a vacuum chamber and create a vacuum therein in order to assure that no air is entrapped in and around the turns of the coil. The suspension of frit, which also is within the vacuum chamber, then is poured into the container to immerse the coil. Heating is then carried out in the manner described above.

The slow rise in temperature of the coil assembly and the solution of glass frit is considered to be important because the slow heating causes the diameter of the wire to increase as the temperature rises. After the highest temperature is reached and the assembly begins to cool, the glass vitrifies around the turns of the coil at a temperature at which the diameter of the wire is still enlarged. Upon further cooling, the diameter of the wire further decreases, thus leaving the vitrified glass in the form of a honeycomb, with minute void spaces between the glass and the turns of wire. Because the hardening temperature of the glass is by necessity higher than the expected operating temperature of the coil, the minute void spaces will remain while the coil is operating in its intended temperature environment. This permits the turns of wire of the coil to have a slight freedom of movement when surges of current are sent through the coil, and prevents crinkling and breaking of the wire with said current surges. It has been found that in prior art methods of encapsulating a coil wherein the coil and encapsulating material were not both raised in temperature together, the encapsulating material was closely bound to the individual turns of wire and did not allow any freedom of movement of the wire. Therefore, with current surges through the coil and with expansion of the wire at high temperatures, stresses and strains were set up in the wire, hot spots readily occurred, and the wires of the coil had a tendency to crinkle and break.

Other encapsulating materials having higher temperature ratings than the glass frit mentioned above may be employed when necessary. One example of such a higher temperature material is a ceramoplastic sold under the trade name Supermica, by Mycalex Corporation of America.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. The method of producing an electrical coil assembly capable of sustained operation at a given high temperature at least twice the operating temperature limit of a silicone insulating compound, said method comprising the steps of winding into a coil a length of conductive wire having an insulating covering comprised of said silicone compound, heating said coil in an oven having an atmosphere containing oxygen to substantially completely convert said silicone compound to a silica ash, said wire increasing in diameter as its temperature increases, distributing unvitrified particles of an encapsulating material throughout the turns of said coil, said material being substantially non-porous at said temperature, and slowly raising together the temperature of said coil and said material to a temperature higher than said operating temperature but below the melting temperature of said conductive wire to plasticize said material so that said material surrounds each turn of said coil, and slowly cooling said coil and encapsulating material to permit said plasticized material to solidify at an elevated temperature and encapsulate the turns of wire of said coil while the wire is of enlarged diameter, thereby permitting the formation of minute void spaces between the encapsulation and said turns of wire upon further cooling of said wire.

2. A method of producing an electrical product having an operating temperature limit at least twice the rated temperature limit of an electrical conductor having a silicone insulating coating from which said product is made, said method comprising the steps of forming said conductor into a form suitable for use in said product, placing said conductor into an oven having an atmosphere containing oxygen, baking said conductor and insulating coating in said oven at a sufficiently high temperature for a sufficiently long time to substantially completely convert said silicone to a silica, the temperature of said oven being below the melting temperature of said conductor, and removing said conductor from said oven and cooling the conductor and the silica coating thereon.

3. A method of raising the operating temperature limit of a commercially available electrical conductor having a silicone insulating coating to at least double its rated temperature limit comprising the steps of placing said conductor into an oven having an atmosphere containing oxygen, baking said conductor and insulating coating in said oven at a sufficiently high temperature for a sufficiently long time to substantially completely convert said silicone to a silica, the temperature of said oven being below the melting temperature of said conductor, and removing said conductor from said oven and cooling the conductor and the silica coating thereon.

4. The combination claimed in claim 3 and further including the step of hermetically sealing said conductor having the silica insulating coating thereon with an electrical insulation material which is substantially non-porous and in a solid state at the intended operating temperature of said conductor.

5. The method of producing an electrical coil assembly having an operating temperature limit at least twice the operating temperature limit of the commercially available wire from which said coil is wound, said method comprising the steps of winding into a coil a length of wire having a silicone compound insulating covering, placing said coil in an oven having an oxygen atmosphere, heating said coil in said oven to a temperature below the melting point of said wire for a sufficient length of time to substantially completely convert said silicone compound to an ash-like substance, and hermetically sealing said coil in a material having high electrical insulating properties and being in the solid state and substantially non-porous at the intended operating temperature of said coil.

References Cited in the file of this patent

UNITED STATES PATENTS

| | | |
|---|---|---|
| 2,239,551 | Dalton et al. | Apr. 22, 1941 |
| 2,428,608 | Bass | Oct. 7, 1947 |
| 2,442,976 | Heany | June 8, 1948 |
| 2,641,044 | Bearer | June 9, 1953 |
| 2,889,952 | Claypoole | June 9, 1959 |
| 2,973,278 | Kadisch et al. | Feb. 28, 1961 |

OTHER REFERENCES

"Chemistry of the Silicone," by Rochow, Wiley Publishing Co. (1946).